United States Patent [19]

Terao et al.

[11] 4,434,429
[45] Feb. 28, 1984

[54] INFORMATION RECORDING MEMBER AND METHOD OF FABRICATING THE SAME

[75] Inventors: Motoyasu Terao, Tokyo; Shinkichi Horigome, Tachikawa; Munehisa Mitsuya, Hachioji; Sakae Ota, Yokohama; Kazuo Shigematsu, Kawasaki, all of Japan

[73] Assignee: Hitachi, Ltd., Tokyo, Japan

[21] Appl. No.: 311,888

[22] Filed: Oct. 15, 1981

[30] Foreign Application Priority Data

Oct. 15, 1980 [JP] Japan .................................. 55-142911

[51] Int. Cl.³ ...................... G01G 15/34; G01D 15/10
[52] U.S. Cl. .................................. 346/135.1; 427/53.1
[58] Field of Search ................... 346/1.1, 76 L, 135.1; 369/284; 427/53.1

[56] References Cited

U.S. PATENT DOCUMENTS

| | | | |
|---|---|---|---|
| 3,132,584 | 5/1964 | Dalton | 346/135.1 X |
| 3,560,994 | 2/1971 | Wolff et al. | 346/135.1 X |
| 3,889,272 | 6/1975 | Lou et al. | 346/135.1 X |
| 4,214,249 | 7/1980 | Kasai et al. | 427/53.1 X |
| 4,322,839 | 3/1982 | Yamashita et al. | 369/284 X |
| 4,348,461 | 9/1982 | Terao et al. | 346/135.1 X |

*Primary Examiner*—Donald A. Griffin
*Attorney, Agent, or Firm*—Antonelli, Terry & Wands

[57] ABSTRACT

An information recording member comprising a substrate, and a thin film formed on the substrate with or without an intermediate layer therebetween and irradiated with a recording beam to make an aperture or recess in the thin film, is disclosed in which the thin film is a crystalline film and has a composition expressed by a general formula $Se_xTe_yM_z$, where x, y and z are given by formulae $0.02 \leq x \leq 0.35$, $0.50 \leq y \leq 0.98$ and $0 \leq z \leq 0.45$, respectively, and M indicates at least one element selected from the group consisting of As, Sb, Bi, S, Si, Ge, Sn, Pb, Al, Ga, In, Tl, Zn, Cd, Au, Ag, Cu, Ni, Pd, Rh, Cr, Mo, W and Ta, and in which the thin film does not deteriorate to such an extent as seen in conventional recording films when a time has elasped, since the thin film is crystalline.

40 Claims, 5 Drawing Figures

DISTANCE FROM SUBSTRATE (A°)

INFORMATION RECORDING MEMBER AND METHOD OF FABRICATING THE SAME

The present invention relates to an information recording member and a method of fabricating the same. In more detail, the present invention relates to an information recording member which allows, for example, a carrier signal frequency-modulated with a video or audio analog signal, or digital information such as a facsimile signal or data from an electronic computer, to be recorded in real time in a recording thin film on a predetermined substrate by means of a recording beam such as a laser beam, and to a method of fabricating the above-mentioned information recording member.

In recent years, attention has been paid to an information recording system, in which information is written by a laser beam or the like in a thin metal film provided on a substrate. In recording systems of this kind, an aperture or recess is made in a metal film by thermal energy of a recording beam such as a laser beam to record information. In this case, the aperture is more advantageous than the recess from the practical point of view.

An object of the present invention is to provide an information recording member which is stable for a long time, and a method of fabricating the above member.

Another object of the present invention is to provide an information recording member which is simple in manufacturing process and has a high reliability, and a method of fabricating the above member.

According to the present invention, there is provided an information recording member comprising: a substrate; and a thin film formed on the substrate with or without an intermediate layer therebetween, the thin film being irradiated with a recording beam to make an aperture or recess in the film, the thin film being a thin crystalline film, the thin crystalline film having a composition expressed by a general formula $Se_xTe_yM_z$, where x, y and z are given by formulae $0.02 \leq x \leq 0.35$, $0.50 \leq y \leq 0.98$ and $0 \leq z \leq 0.45$, respectively, and M indicates at least one element selected from a group consisting of As, Sb, Bi, S, Si, Ge, Sn, Pb, Al, Ga, In, Tl, Zn, Cd, Au, Ag, Cu, Ni, Pd, Rh, Cr, Mo, W and Ta. Further, according to the present invention, there is provided a method of fabricating the above-mentioned recording member.

Now, explanation will be made on the outline of a method for recording information in a disc-shaped recording member by light.

Figure 1:
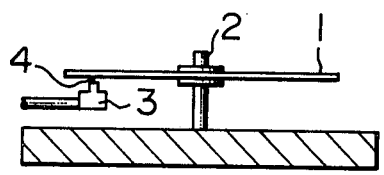
FIG. 1 is an explanatory view showing the outline of a method of recording information in a recording member according to the present invention.
Figure 2:
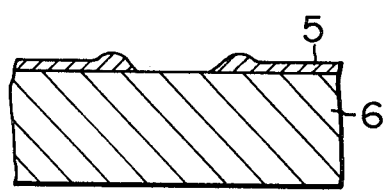
FIG. 2 is a sectional view showing a state that an aperture is made in a recording member according to the present invention to perform a recording operation.

Referring to FIG. 1, a recording member 1 (namely, a photo-sensitive disc) is rotated about an axis 2 of rotation at a high speed, a spacing between a recording head 3 and a recording film in the disc 1 is kept constant, and a laser beam 4 which is modulated in accordance with information to be recorded and thereby has the form of a pulse train, is focused on the recording film to irradiate the recording film with the laser beam 4. The laser beam 4 may be replaced by an electron beam and others. As shown in FIG. 2, that portion of the recording film 5 which is irradiated with the laser beam, is melted on a substrate 6 and deformed due to thermal motion, and moreover a part of the film is evaporated. When at a part of the irradiated portion, the substrate is exposed due to the above-mentioned deformation and evaporation, the aperture in the film is enlarged by surface tension, and a lip is formed around the aperture.

Various materials have been hitherto known which can make a recording film having a practical sensitivity. For example, bismuth, tellurium, cadmium, chalcogenide glasses, crystalline chalcogenides and others may be used to make the recording film. However, these materials have drawbacks as mentioned below. When the recording film is made of the material containing only a single element, the film is readily oxidized. When the film is made of the material containing two or more elements, it is not easy to form the film. Although the film can be formed by the simultaneous multi-source rotary evaporation method and others, it is difficult to entirely prevent an evaporated amorphous film from crystallizing at ordinary temperatures. In most cases, large crystal grains are formed when the amorphous film crystallizes. Each of the crystal grains produces birefringence. Since the crystal grains are different in the direction of crystal axis from each other, when a laser beam is incident upon the crystal grains, the effect of birefringence on the state of polarization of transmitted or reflected light varies with every crystal grain. Accordingly, a large amount of noise is generated in a reproduced signal. Such an effect of birefringence is larger in the case where the film is made of tellurium and selenium than in the case where the film is made of only tellurium. Further, when crystallized regions and amorphous regions coexist in the recording film, the recording operation and read-out operation are adversely affected, since the crystallized portion and the amorphous portion differ from each other in reflectivity and transmissivity.

On the other hand, the following references are also known to show the state of the art: i.e. U.S. Pat. No. 4,238,803 and Japanese Laid-Open Patent Application No. 51733/1975.

As mentioned previously, a recording member according to the present invention is required to comprise a crystalline recording film. However, it is not always required that the recording film is crystalline entirely in the direction of film thickness, but a part of the film in the direction of film thickness may be amorphous. For example, that small part of the recording film which is kept in contact with a substrate or intermediate layer, may be amorphous due to the existence of the above layer. In other words, the recording film should not be divided into large crystallized regions and large amorphous regions in the direction parallel to the substrate. The Te content and Se content are required to lie in the previously-mentioned ranges, respectively, for the following reasons. A recording film containing an appropriate amount of Se in addition to Te has a high recording sensitivity for a laser beam from a diode laser, and moreover is more stable in wet air as compared with a film containing only Te. Further, the addition of Se to the Te film has advantages such that the smoothness of the film is improved and the shape of an aperture made by recording is clean. The average concentration of Se lies preferably in a range from 2 to 35 atomic percent, more preferably in a range from 5 to 25 atomic percent. It is not required that the concentration of Se is constant in the direction of film thickness. That is, a small part of the recording film in the direction of film thickness may contain Se at a concentration departing from the above-mentioned preferable range, so far as an average concentration of Se in the recording film lies in the preferable range. When the amount of Se added to the Te film is small, Te is rapidly oxidized in wet air. Accordingly, it is especially preferable that an average concentration of Se in the recording film is equal to or greater than 2 atomic percent, and at least one of the surface of the recording film and the part of the film kept in contact with the substrate or intermediate layer contains Se at a concentration of more than 2 atomic percent. When the average concentration of Se is too large, the recording film has a low sensitivity for the laser beam from the diode laser, and moreover faults are apt to be caused by crystal grains each containing a relatively large amount of Se. Various elements other than Te and Se can produce some effects when added to the recording film. These elements are at least one selected from a group consisting of As, Sb, Bi, S, Si, Ge, Sn, Pb, Al, Ga, In, Tl, Zn, Cd, Au, Ag, Cu, Ni, Pd, Rh, Cr, Mo, W and Ta. The total content of these elements is preferably less than 45 atomic percent. The content of these elements is not required to be constant in the direction of film thickness. Of these elements, In, Sn and Pb are especially preferable, since the elements In, Sn and Pb increase the adhesive force between the recording film and the substrate and suppress the generation of noise due to crystal grains. The content of the elements is preferably in a range from 1 to 30 atomic percent, more preferably in a range from 5 to 20 atomic percent. A preferable element next to In, Sn, Pb is bismuth. A preferable range of Bi content is 1 to 30 atomic percent. One of other preferable elements is Sb, which improves the smoothness of the evaporated film. An especially preferable range of Sb content is 1 to 30 atomic percent. Further, arsenic can also improve the smoothness of the evaporated film. A preferable range of As content is 0.1 to 35 atomic percent, more preferably 0.1 to 5 atomic percent. When only As is evaporated, As film deposited on a shutter flakes away and thereby faults are apt to be generated on the recording film. Accordingly, it is required to use a mixture or compound of Te and As as the evaporation source of As. In the case where the As content is large, not only it is difficult to obtain a reproducible film but also large crystal grains are generated when the recording film is crystallized after the deposition, and noise is thereby increased. When the recording film contains As, the adhesive force between the film and the substrate is decreased, and cracks are readily generated in the film. While Si and Ge can also improve the smoothness of the recording film it is difficult to evaporate these elements in vacuum, and moreover there is a fear of these elements remaining in the aperture at a recording period. The content of these elements is preferably in a range from 1 to 5 atomic percent. Further, Ga, Zn and Cd can increase the light absorption of the film. The content of these elements is preferably in a range from 1 to 30 atomic percent. Further, Al, Au, Ag, Cu, Ni, Pd, Rh, Cr, Mo, W and Ta can increase the reflectivity of the film. The content of these elements is preferably in a range from 1 to 15 atomic percent. Sulphur facilitates evaporation of the recording film in the recording. A preferable range of S content is 1 to 15 atomic percent. Thallium prevents the structure of the film from being varied. A preferable range of Tl content is 1 to 10 atomic percent. Each of such other elements as Mn, Ti, V, Zr, Nb and Fe does not produce a remarkable change in the property of the film when added to the film at a low concentration. The advantages of the films containing only Te and Se are easy formation of film and low cost as compared with the films which contain third element.

The recording film is formed by the vacuum evaporation method or evaporation-in-gas method, preferably the simultaneous multi-source rotary evaporation method which will be explained in detail in an embodiment of the present invention. Further, other conventional methods such as sputtering can be used to form the recording film. The sensitivity of the recording film can be increased by employing as the recording film a composite film which includes portions made of an organic compound and other portions containing Te as its main component. The composite film is formed by, for example, simultaneous multi-source rotary evaporation method.

The recording film can be crystalline even immediately after the film has been evaporated, depending upon the composition of the film and the conditions of evaporation. However, the recording film is usually amorphous immediately after the evaporation, and is crystallized by heat treatment. Thus, a recording film which is small in unevenness and has only a small number of faults can be obtained. The heat treatment is preferably carried out at a temperature of 40° to 70° C. The period of the heat treatment depends on the film composition, for example, the recording film is required to be kept at 40° C. for a period of 3 to 4 days, or at 70° C. for a period of 1 to 2 hours. The recording film which is crystallized by the heat treatment at a temperature of 40° to 70° C. has very fine crystal grains.

The substrate, on which a recording film according to the present invention is deposited, may be made of metal, glass, or an organic compound, or may be a composite substrate made of these materials.

An intermediate layer may be provided between the recording film and the substrate to reduce reflectivity, to improve the adhesion between the film and substrate, and to suppress noise. At the recording period, apertures may be made also in the intermediate layer, or the intermediate layer may be left unchanged. Further, the optical property of the intermediate film may be changed or unchanged at the recording period. An intermediate layer containing Bi as the main component can reduce noise. In more detail, noise is readily produced in the recording film, which contains Te as its main component, due to birefringence of crystal grains, but is scarcely produced in the Bi layer. Accordingly, when the read-out operation is performed through the substrate, noise can be reduced by the Bi layer. If only the Bi layer is used as the recording film, the Bi layer is readily oxidized, and therefore is low in stability. Further, if the Bi layer is covered with a film containing Se as its main component, light transmissivity is increased due to the reaction of Se with Bi and oxygen permeation. Since the Bi layer is actually covered with the recording film containing Te as its main component, the stability of the Bi layer is improved and such an increase in light transmissivity scarcely takes place. When Se is added to the Bi layer, the stability thereof is further improved. Also, when Sb is added to the Bi layer in place of Se, the stability can be improved. In the case where a layer of an organic compound is provided on the surface of the substrate, there is the possibility of water and oxygen entering the Bi layer on the side facing the substrate. The adverse effect due to the above water and oxygen can be reduced by increasing the concentration of Se or Sb in the Bi layer toward the substrate, that is, by making high the concentration of Se or Sb at the interface between the Bi layer and substrate. At the recording period, apertures are made in the intermediate layer containing Bi as its main component. The Se or Sb content of the intermediate layer containing Bi as its main component is preferably in a range from 2 to 35 atomic percent. Such an intermediate layer is usually crystalline. Further, preferable elements next to Bi for the intermediate layer are Sn and Pb. When used as the intermediate layer, a Cr layer having a thickness of 1 to 100 Å can remarkably improve the adhesion between the recording film and substrate. In an interface region between the intermediate layer and recording film, the composition may be continuously changed.

The thickness of the recording film is preferably in a range from 30 to 600 Å, more preferably in a range from 250 to 600 Å.

The thickness of the intermediate layer is preferably in a range 1 to 3000 Å. In the case where the apertures are made also in the intermediate layer, a preferable thickness range of the intermediate layer is 1 to 350 Å. When the intermediate layer contains Bi as its main component, a preferable thickness range thereof is 50 to 300 Å.

In the case where the apertures are made in both of the recording film and intermediate layer, the total thickness of the recording film and intermediate layer is preferably in a range from 250 to 600 Å.

When a protection film is formed directly on the recording film, the thickness of the recording film is preferably in a range from 30 to 250 Å. The protection film can be made of an organic compound, an oxide or a chalcogenide.

A recording member according to the present invention is especially advantageous in the case where an energy beam for irradiating the recording film, for example, a laser beam forms a light spot having a diameter of 0.5 to 2 μm and the recording aperture has a minor axis of 0.5 to 1.5 μm.

The present invention will be explained below in detail, by means of embodiments thereof.

EMBODIMENT 1

Figure 3:
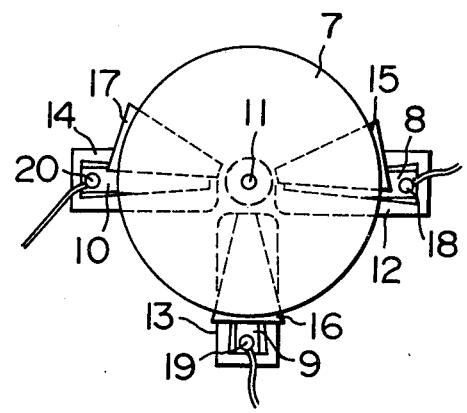
FIG. 3 is a plan view showing the inner structure of a vacuum evaporation device for depositing a thin film according to the present invention.

A substrate 7 in which a replica of tracking grooves in an ultraviolet radiation setting resin was provided on the surface of a chemically reinforced glass plate having a diameter of 30 cm, a thickness of 1.1 mm and the form of a doughnut was arranged in a vacuum evaporation equipment having such an inner structure as shown in FIG. 3. In the evaporation device were placed three evaporation boats 8, 9 and 10. These boats were arranged below that part of a disc in which information was recorded, and on a circle having the same center as a rotary shaft 11 for the disc. In order to prevent molten droplets or small particles of an evaporation material from flying to the substrate to adhere thereto, each of these boats had a structure that the evaporation material was not viewed directly from that part of the substrate on which an evaporated film was formed. Two of the boats were charged with Te and Se, respectively. Between these boats and the substrate were arranged masks 12, 13 and 14 and shutters 15, 16 and 17. Each of the masks has a sector-shaped slit, and a slit angle (namely, an angle of the slit at the apex thereof) was made nearly equal to 12°. While rotating the substrate at 120 rpm, an electric current was supplied to each boat to evaporate the evaporation source in each boat. The rate of evaporation in respective boats was detected by quartz crystal-oscillator type film thickness monitors 18, 19 and 20, and the electric current flowing through each boat was controlled so that the rate of evaporation was kept constant. A ratio between the rate of evaporation of Te and that of Se was selected so that a ratio of the number of Te atoms in a deposited film to the number of Se atoms was equal to 80:20. Two shutters corresponding to the boats charged respectively with Te and Se were simultaneously opened to their full width, and were simultaneously closed when the film thickness became nearly equal to 300 Å. The film thus formed was fairly regular in the arrangement of atoms, as it was. Then, the film was kept at 60° C. for about 24 hours to be more crystallized.

A recording operation for the film thus treated was performed in the following manner. The disc, on which the recording film was deposited, was rotated at 600 rpm, a laser beam emitted from a diode laser and having a wavelength of 8300 Å and an intensity insufficient for recording was focused on the recording film with a lens in a recording head from the substrate side, and the reflected light from the disc was detected to drive the recording head in a manner that the center of the tracking groove always coincided with the center of the laser spot. Further, while performing such a tracking operation, automatic focussing was carried out so that the laser beam was just focussed on the recording film, and the intensity of the laser beam was increased or restored to the initial value in accordance with an information signal in order to perform the recording operation. Further, in the recording operation, the laser spot was caused to jump to another groove, if necessary. The recording was carried out in a manner that apertures each having a diameter of about 0.8μ and reaching the substrate were made in the recording film.

The read-out operation was performed in the following manner. The disc was rotated at 600 rpm. Further, while carrying out the same tracking operation and automatic focussing as in the recording operation, the laser beam having an intensity insufficient for recording was incident on the disc, and the intensity of the reflected light was detected to reproduce information. In the present embodiment, an error rate of about $5 \times 10^{-6}$ was obtained.

When an evaporated film having the same thickness as above-mentioned recording film but containing only Te was held for one week in an atmosphere of 60° C. and more than 90 percent relative humidity, the transmissivity of the film exceeded 60 percent. On the other hand, when the recording film of the present embodiment was held in the same atmosphere for one month, the transmissivity of the recording film was kept unchanged and was less than 20 percent at the wavelength of 8300 Å.

When the thickness of the recording film according to the present embodiment was made larger, the error rate varied in the following manner:

| film thickness | error rate |
| --- | --- |
| 500 Å | about $8 \times 10^{-6}$ |
| 600 Å | about $1 \times 10^{-5}$ |
| 1000 Å | about $1 \times 10^{-4}$ |

The error rate was large when the film thickness was too large. This is due to the facts that the lip around the aperture becomes large, the spacing between apertures becomes small, and therefore the normal read-out operation cannot be performed. Further, the sensitivity of the recording film was decreased as the film thickness was too large, and it was difficult to record information in the recording film.

When recording films containing Se at different concentrations were prepared and held in a cleam atmosphere of 25° C. and about 90 percent relative humidity for three months, the error rate became nearly saturated and had the following values:

| Se content | error rate |
| --- | --- |
| 1% | about $1 \times 10^{-4}$ |
| 2% | about $1 \times 10^{-5}$ |
| 5% | about $7 \times 10^{-6}$ |
| 25% | about $7 \times 10^{-6}$ |
| 35% | about $1 \times 10^{-5}$ |
| 50% | about $1 \times 10^{-4}$ |

When the Se content exceeded 35 percent, faults were generated in the film due to crystal grains, and further the light absorption of the film became insufficient. Therefore, it was difficult to record information. When the Se content was less than 2 percent, the light absorption became insufficient due to the oxidation of Te, and therefore it was difficult to record information.

The evaporation source of Te was replaced by an evaporation source of As and Te to prepare a recording film containing Te, Se and As. When recording films containing As at different concentrations were held in a clean atmosphere of 25° C. and about 90 percent relative humidity for three months, the error rate became nearly saturated and had the following values:

| average content of As | error rate |
| --- | --- |
| 3% | about $7 \times 10^{-6}$ |
| 5% | about $1 \times 10^{-5}$ |
| 7% | about $3 \times 10^{-5}$ |
| 30% | about $6 \times 10^{-5}$ |
| 35% | about $1 \times 10^{-4}$ |
| 45% | about $5 \times 10^{-4}$ |

In the above case, the average concentration of Se was made equal to 20 percent.

The error rate was large as the As content of the recording film was too large. This is because the size of crystal grain becomes large when the recording film is crystallized and thereby noise is increased. When an especially large amount of As was added, the error rate became large due to the generation of $As_2O_3$ crystal particles. When the As content exceeded 30%, the sensitivity of the recording film was decreased and it was difficult to record information, since the Te content became less than 50 percent.

Figure 4:
FIG. 4 is a sectional view of a recording member according to the present invention.

When the disc was acutally used, a chemically reinforced glass plate 24 which had the same dimension as the substrate 7, was made to adhere to the substrate 7 with spacers 21 and 22 between them as shown in FIG. 4, to prevent dust from adhering to the recording film 23. When the glass plate 24 was provided with a replica of tracking grooves and a recording film 25, it was possible to record information on both sides of the disc. The above-mentioned adhesion was achieved with a commercially available agent. Especially, an adhesive agent requiring no solvent (such as an epoxy resin) could avoid damage to the recording film, and an ultraviolet radiation setting adhesive agent was preferably employed since the adhesion could be made efficiently. Even in the case where a structure shown in FIG. 4 is employed, it is required to make the recording film of a material which is hard to oxidize, since moisture can pass through the adhesive agent easily.

For example, in the case where a recording film containing As at a concentration of 30 percent was not subjected to the heat treatment, and when the recording film was held at ordinary temperature for about two months, crystallization took place locally in the recording films, and therefore the recording sensitivity varied with portions of the film. This phenomenon was also observed in other recording films containing As at different concentrations, though the speed and extent of the crystallization were different from those of the above-mentioned example. Accordingly, it is preferable to carry out the heat treatment after evaporation.

In the case where a protection film made of an organic compound, oxide, or sulfide, etc., for example, paraffin, SiO, $GeO_2$, or $Sb_2S_3$, was formed directly on the recording film, it was difficult to record information in the recording film unless the thickness of the recording film was not greater than 250 Å, and the property of the recording film varied considerably with time unless the thickness of the recording film was not less than 30 Å.

EMBODIMENT 2

In the vacuum evaporation device having such an inner structure as shown in FIG. 3 was arranged a substrate 7 in which a replica of tracking grooves in an ultraviolet radiation setting resin was provided on the surface of a tempered glass plate having a diameter of 30 cm, a thickness of 1.1 mm and the form of a doughnut. The evaporation boats 8, 9 and 10 in the evaporation device were charged with Te, Se and In, respectively. While rotating the substrate at 120 rpm, an electric current was supplied to each boat to evaporate the evaporation source in each boat. The rate of evaporation in respective boats was detected by the quartz crystaloscillator type film thickness monitors, and the electric current flowing through each boat was controlled so that the rate of evaporation was kept constant. The rate of evaporation in each boat was so selected that the number of Te atoms, the number of Se atoms and the number of In atoms in a deposited film were in the ratios 80:10:10. Three shutters corresponding respectively to the boats 8, 9 and 10 were simultaneously opened, and were simultaneously closed when the film thickness became nearly equal to 350 Å. The film thus formed was kept at 60° C. for about 24 hours for further crystallization.

The recording operation for the film thus treated was performed in the following manner. The disc, on which the recording film was evaporated, was rotated at 600 rpm, a laser beam emitted from the diode laser and having a wavelength of 8300 Å and an intensity insufficient for recording was focused on the recording film with the lens in the recording head from the substrate side, and the reflected light from the disc was detected to drive the recording head in a manner that the center of the tracking groove always coincided with the center of the laser spot. While performing such a tracking operation, automatic focussing was carried out so that the laser beam was just focused on the recording film, and the intensity of the laser beam was increased or restored to the initial value in accordance with an information signal in order to perform the recording operation. Further, in the recording operation, the laser spot was caused to jump to another groove, if necessary,. The recording was performed in a manner that apertures each having a diameter of about 0.8 μm and reaching the substrate were made in the recording film.

The read-out operation was performed in the following manner. The disc was rotated at 600 rpm. Further, while carrying out the same tracking operation and automatic focussing as in the recording operation, the laser beam having an intensity insufficient for recording was incident on the disc, and the intensity of the reflected light was detected to reproduce information. In this embodiment, an error rate of about $2 \times 10^{-6}$ was obtained. When a deposited film having the same thickness as the above-mentioned recording film but containing only Te was held for one week in an atmosphere of 60° C. and more than 90 percent relative humidity, the transmissivity of the film exceeded 60 percent. On the other hand, when the recording film of the present embodiment was held in the same atmosphere for three weeks, the transmissivity of the recording film was unchanged and was less than 15 percent at the wavelength of 8300 Å.

When recording films containing Se at different concentrations were prepared and held for three months in a clean atmosphere of 25° C. and about 90 percent relative humidity, the error rate became nearly saturated and had the following values:

| Se content | error rate |
| --- | --- |
| 1% | about $3 \times 10^{-4}$ |
| 2% | about $1 \times 10^{-5}$ |
| 5% | about $5 \times 10^{-6}$ |
| 25% | about $5 \times 10^{-6}$ |
| 35% | about $1 \times 10^{-5}$ |
| 40% | about $3 \times 10^{-5}$ |
| 45% | about $1 \times 10^{-4}$ |

When recording films containing In at different concentrations were prepared and held for three months in a clean atmosphere of 25° C. and about 90 percent relative humidity, the error rate became nearly saturated and had the following values:

| In content | error rate |
| --- | --- |
| 0.5% | about $6 \times 10^{-6}$ |
| 1% | about $3 \times 10^{-6}$ |
| 30% | about $3 \times 10^{-6}$ |
| 35% | about $6 \times 10^{-6}$ |
| 40% | about $1 \times 10^{-5}$ |
| 45% | about $1 \times 10^{-4}$ |
| 50% | about $4 \times 10^{-4}$ |

When the film contained too much In, the recording film was easily oxidized and therefore the error rate became large. Further, the signal-to-noise (S/N) ratio obtained when a video signal was recorded in and read out of the recording film containing In at a concentration of 5 to 20 percent, was at least 5 dB higher than the S/N ratio obtained when the video signal was recorded in a recording film which did not contain In.

When other elements were added to the recording film in place of In, a favorable error rate was obtained in the following concentration ranges:

| element | concentration range |
| --- | --- |
| Sn | 1 to 30% |
| Pb | 1 to 30% |
| Bi | 1 to 30% |
| Sb | 1 to 30% |
| Si | 1 to 5% |
| Ge | 1 to 5% |
| Ga | 1 to 30% |
| Zn | 1 to 30% |
| Cd | 1 to 30% |
| Al | 1 to 15% |
| Au | 1 to 15% |
| Ag | 1 to 15% |
| Cu | 1 to 15% |
| Ni | 1 to 15% |
| Pd | 1 to 15% |
| Rh | 1 to 15% |
| Cr | 1 to 15% |
| Mo | 1 to 15% |
| W | 1 to 15% |
| Ta | 1 to 15% |
| S | 1 to 15% |
| Tl | 1 to 10% |

Specifically, when each of Sn and Pb was added to the recording film at a concentration of 1 to 30 percent, there was obtained the same effect as in the case where In was added at the previously-mentioned concentrations.

When the recording film of the present embodiment (namely, the recording film containing Te, Se and In) was made larger in thickness, the error rate varied in the following manner:

| film thickness | error rate |
| --- | --- |
| 500 Å | about $5 \times 10^{-6}$ |
| 600 Å | about $1 \times 10^{-5}$ |
| 1000 Å | about $1 \times 10^{-4}$ |

The error rate was large (that is, the performance of the film was deteriorated), when the film thickness was too large. This is due to the facts that the lip around the aperture becomes large, the spacing between apertures becomes small, and therefore the normal read-out operation cannot be performed. Further, the sensitivity of the recording film was decreased as the film thickness was too large, and it was difficult to record information in the recording film.

The optimum thickness of the recording film in the case where a protection film was formed directly on the recording film, varied in the same manner as in

EMBODIMENT 1

When paraffin was evaporated in place of In in order to form a composite recording film made up of Te-Se portions and organic compound portions, the sensitivity of the recording film was increased by a factor of more than 1.2. In this case, such a remarkable deterioration in characteristic as seen when the In content exceeded 45 percent, did not take place when the paraffin content exceeded 45 percent, so far as a ratio of the number of Te atoms to the number of Se atoms was in the range of the present invention.

EMBODIMENT 3

Figure 5:
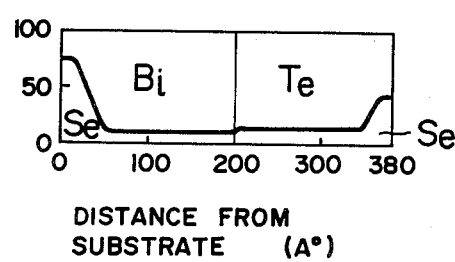
FIG. 5 is a graph showing a distribution of composition in the direction of film thickness, in an embodiment of a recording film according to the present invention.

A substrate similar to that in EMBODIMENT 1 was placed in the same vacuum evaporation device as in EMBODIMENT 1. Three boats in the evaporation device were charged with Te, Se and Bi, respectively. While rotating the substrate at 120 rpm, an electric current was supplied to each of two boats charged respectively with Bi and Se. Further, the angles of the shutters corresponding to these boats was adjusted so that a ratio of the number of Se atoms to the number of Bi atoms, in a deposited intermediate layer was distributed as shown in FIG. 5, and the thickness of the layer was made nearly equal to 20 nm. Successively, an electric current was supplied to each of two boats charged respectively with Te and Se, and the angles of the shutters corresponding to these boats was adjusted so that a ratio of the number of Se atoms to the number of Te atoms in the recording film was distributed as shown in FIG. 3. The thickness of the recording film was made nearly equal to 18 nm. Thus, a double-layered film having a thickness of about 38 nm was formed. The recording operation and read-out operation were performed in the same manner as in EMBODIMENT 1, and apertures each reaching the substrate were made in the film at the recording period.

When a video signal was recorded in and read out of the film of the present embodiment, an S/N ratio of about 40 dB was obtained.

A time required for the recording sensitivity of a double-layered film, which did not have the high Se content region in the neighborhood of the substrate, to decreease by a factor of 20 percent was one-half that required for the recording sensitivity of the composite film of the present embodiment to decrease by the same factor.

When the thickness of the intermediate layer containing Bi and Se was varied while keeping constant the total thickness of the intermediate layer and recording film, the S/N ratio varied in the following manner:

| thickness of intermediate layer | S/N ratio |
| --- | --- |
| 30 A | about 30 dB |
| 50 A | about 35 dB |
| 80 A | about 38 dB |
| 250 A | about 38 dB |
| 300 A | about 35 dB |
| 350 A | about 30 dB |

When the total thickness of the intermediate layer and recording film was varied while keeping constant a ratio of the thickness of the intermediate layer to the thickness of the recording film, the error rate varied in the same manner as in EMBODIMENT 1.

When the intermediate layer contained Se too little, the transmissivity of the double-layered film became high due to the oxidation. On the other hand, when the intermediate layer contained too much Se, the transmissivity became high due to the formation of a compound. In either case, the recording sensitivity was decreased. A preferable range of the Se content of the intermediate layer was 2 to 35 atomic percent, and a preferable range of the Se content of the recording film was also 2 to 35 atomic percent. Accordingly, the concentration of Se was preferably in a range from 2 to 35 atomic percent throughout the intermediate layer and recording film. The intermediate layer had an oxidation preventing function, when Sb was added to the layer in place of Se.

In this case, when the Sb content of the intermediate layer exceeded 35 percent, both of the sensitivity and the S/N ratio were considerably reduced due to an increase in reflectivity and a going up of melting point.

What is claimed is:

1. An information recording member comprising:
   a substrate; and
   a thin film formed on said substrate with or without an intermediate layer therebetween, said thin film being irradiated with a recording beam to make an aperture or recess in said thin film, said thin film being a thin crystalline film, said thin crystalline film having a composition expressed by a general formula $Se_xTe_yM_z$, where x, y and z are given by the formulae $0.02 \leq x \leq 0.35$, $0.50 \leq y \leq 0.98$ and $0 \leq z \leq 0.45$, respectively, and M indicates at least one element selected from the group consisting of Sb, Bi, S, Si, Ge, Sn, Pb, Al, Ga, In, Tl, Zn, Cd, Au, Ag, Cu, Ni, Pd, Rh, Cr, Mo, W, and Ta, whereby oxidation of Te is sufficiently decreased, as compared with a thin film not containing $Se_x$, to provide a recording member having good stability.

2. An information recording member according to claim 1, wherein said x is given by a formula $0.05 \leq x \leq 0.25$.

3. An information recording member according to claim 1, wherein said z is equal to zero.

4. An information recording member according to claim 3, wherein $0.05 \leq x \leq 0.25$ in said general formula.

5. An information recording member according to claim 1, wherein said M appearing in said general formula indicates at least one element selected from the group consisting of In, Pb and Sn.

6. An information recording member according to claim 5, wherein said z is given by a formula $0.01 \leq z \leq 0.30$.

7. An information recording member according to claim 4, wherein $0.05 \leq z \leq 0.20$ in said general formula.

8. An information recording member according to claim 1, wherein said M appearing in said general formula indicates at least one element selected from the group consisting of Sb and Bi.

9. An information recording member according to claim 8, wherein said z is given by a formula $0.01 \leq z \leq 0.30$.

10. An information recording member according to claim 1, wherein said M appearing in said general formula indicates at least one element selected from the group consisting of Si and Ge.

11. An information recording member according to claim 10, wherein said z is given by a formula $0.01 \leq z \leq 0.05$.

12. An information recording member according to claim 1, wherein said M appearing in said general formula indicates at least one element selected from the group consisting of Ga, Zn and Cd.

13. An information recording member according to claim 12, wherein said z is given by a formula $0.01 \leq z \leq 0.30$.

14. An information recording member according to claim 1, wherein said M appearing in said general formula indicates at least one element selected from the group consisting of Al, Au, Ag, Cu, Ni, Pd, Rh, Cr, Mo, W and Ta.

15. An information recording member according to claim 14, wherein said z is given by a formula $0.01 \leq z \leq 0.15$.

16. An information recording member according to claim 1, wherein said M appearing in said general formula indicates sulphur.

17. An information recording member according to claim 16, wherein said z is given by a formula $0.01 \leq z \leq 0.15$.

18. An information recording member according to claim 1, wherein said M appearing in said general formula indicates thallium.

19. An information recording member according to claim 18, wherein said z is given by a formula $0.01 \leq z \leq 0.10$.

20. An information recording member according to any one of claims 1 to 19, wherein said thin film has a thickness of 30 to 600 Å.

21. An information recording member according to claim 20, wherein said thin film has a thickness of 250 to 600 Å.

22. An information recording member according to any one of claims 1 to 19, wherein a protection film is formed on said thin film.

23. An information recording member according to claim 22, wherein said thin film has a thickness of 30 to 250 Å.

24. An information recording member according to any one of claims 1 to 19, wherein an intermediate layer is provided between said thin film and said substrate.

25. An information recording member according to claim 24, wherein said intermediate layer is made of Cr, having a thickness of 1 to 100 Å.

26. An information recording member according to claim 24, wherein said intermediate layer is made of Sn or Pb.

27. An information recording member according to claim 24, wherein said intermediate layer has a thickness of 1 to 3000 Å.

28. A method of fabricating an information recording member, comprising a step of heating an information recording member including a substrate and a thin film to crystallize said thin film, said thin film being formed on said substrate with or without an intermediate layer therebetween, said thin film being irradiated with a recording beam to make an aperture or recess in said thin film, said thin film having a composition expressed by the general formula $Se_xTe_yM_z$, where x, y and z are given by formulae $0.02 \leq x \leq 0.35$, $0.50 \leq y \leq 0.98$ and $0 \leq z \leq 0.45$, respectively, and M indicates at least one element selected from the group consisting of Sb, Bi, S, Si, Ge, Sn, Pb, Al, Ga, In, Tl, Zn, Cd, Au, Ag, Cu, Ni, Pd, Rh, Cr, Mo, W and Ta, to provide an information recording member wherein oxidation of the Te of the thin film thereof is sufficiently decreased as compared with a recording member formed with a thin film not containing $Se_x$ so as to provide a recording member having a good stability.

29. A method of fabricating an information recording member according to claim 28, wherein said thin film is formed by the vacuum evaporation method.

30. A method of fabricating an information recording member according to claim 28, wherein said thin film has a thickness of 30 to 600 Å.

31. A method of fabricating an information recording member according to any one of claims 28 to 30, wherein said information recording member is heated at a temperature of 40° to 70° C. in said heating step.

32. An information recording member comprising:
a substrate; and
a thin film formed on said substrate with an intermediate layer between said thin film and said substrate, said thin film being irradiated with a recording beam to make an aperture or recess in said thin film, said thin film being a thin crystalline film, said thin crystalline film having a composition expressed by the general formula $Se_xTe_yM_z$, where x, y and z are given by formulae $0.02 \leq x \leq 0.35$, $0.50 \leq y \leq 0.98$ and $0 \leq z \leq 0.45$, respectively, and M indicates at least one element selected from the group consisting of Sb, Bi, S, Si, Ge, Sn, Pb, Al, Ga, In, Tl, Zn, Cd, Au, Ag, Cu, Ni, Pd, Rh, Cr, Mo, W and Ta, and wherein said intermediate layer contains Bi as the main component thereof.

33. An information recording member according to claim 32, wherein said intermediate layer contains Se or Sb, in addition to Bi acting as said main component.

34. An information recording member according to claim 33, wherein the concentration of Se or Sb in said intermediate layer is increased toward an interface between said intermediate layer and said substrate.

35. An information recording member according to claim 33, wherein an average concentration of Se or Sb in said intermediate layer lies in a range from 2 to 35 atomic percent.

36. An information recording member according to claim 32, wherein the thickness of said intermediate layer is 50 to 300 Å.

37. An information recording member comprising a substrate and a thin film formed directly on or over said substrate with an intermediate layer interposed therebetween, said thin film being irradiated with a recording beam to form therein an aperture or a recess, wherein said thin film is a thin crystalline film having a composition expressed by a general formula $Se_xTe_yM'_zM''_k$, where M' represents at least one element selected from the group consisting of In, Pb, Sn, Sb and Bi and M'' represents at least one element selected from the group consisting of S, Al, Au, Ag, Cu, Ni, Pb, Rh, Cr, Mo, W and Ta, and $0.02 \leq x \leq 0.35$, $0.50 \leq y \leq 0.98$, $0.01 \leq z \leq 0.30$ and $0 \leq k \leq 0.15$.

38. An information recording member according to claim 37, wherein $0.05 \leq x \leq 0.25$ in said general formula.

39. An information recording member according to claim 37 or 38, wherein said thin film has a thickness of 30 to 600 Å.

40. An information recording member according to claim 1 or 37, wherein at least one of the surface of the thin film furthest from the substrate and the surface of the thin film closest to the substrate has a composition expressed by said general formula wherein x is $0.02 \leq x \leq 0.35$.

* * * * *

UNITED STATES PATENT AND TRADEMARK OFFICE
CERTIFICATE OF CORRECTION

PATENT NO. : 4,434,429
DATED      : February 28, 1984
INVENTOR(S): M. Terao et al It is certified that error appears in the above-identified patent and that said Letters Patent is hereby corrected as shown below:

Claim 37, line 11, "Pb" should read --Pd--.

Signed and Sealed this

Twenty-third Day of April 1985

[SEAL]

*Attest:*

DONALD J. QUIGG

*Attesting Officer*      *Acting Commissioner of Patents and Trademarks*